US005499271A

United States Patent [19]

Plenge et al.

[11] Patent Number: 5,499,271

[45] Date of Patent: Mar. 12, 1996

[54] METHOD FOR BROADCASTING A DIGITALLY CODED STREAM OF DATA USING AN ALREADY OCCUPIED FREQUENCY SPECTRUM

[75] Inventors: Georg Plenge, Thanning; Günter Schneeberger, München, both of Germany

[73] Assignee: Institut für Rundfunktechnik GmbH, München, Germany

[21] Appl. No.: 946,475

[22] PCT Filed: Apr. 8, 1992

[86] PCT No.: PCT/EP92/00795

§ 371 Date: Nov. 10, 1992

§ 102(e) Date: Nov. 10, 1992

[87] PCT Pub. No.: WO92/19053

PCT Pub. Date: Oct. 29, 1992

[30] Foreign Application Priority Data

Apr. 11, 1991 [DE] Germany .......................... 41 11 855.3

[51] Int. Cl.[6] .................................................... H04L 27/10

[52] U.S. Cl. ............................................................ 375/295

[58] Field of Search .................................... 375/303, 272, 375/273, 275, 323, 334, 335, 295, 302; 455/62, 42, 45, 59, 205, 206; 332/117, 100; 370/111

[56] References Cited

U.S. PATENT DOCUMENTS 5,315,583 5/1994 Murphy et al. .......................... 370/18

FOREIGN PATENT DOCUMENTS 0372499 6/1990 European Pat. Off. .

OTHER PUBLICATIONS

Rundfunktechnische Mitteilungen, Bd. 29, Nr. 1, Jan. 1985, Norderstedt de, pp. 1–8; U. Messerschmid et al.: "Digitaler Hörfunk im . . . ".

Rundfunktechnische Mitteilungen, Bd. 29, Nr. 6, Nov. 1985, Norderstedt de; L. Dudek: "Digitale Übertragung über . . . ".

*Primary Examiner*—Stephen Chin
*Assistant Examiner*—Hai H. Phan
*Attorney, Agent, or Firm*—Spencer & Frank

[57] ABSTRACT

In order to permit and already occupied frequency spectrum to be utilized for the radio transmission of a data stream without interfering with the services already established there, a plurality of the RF carriers modulated with the data stream are either transmitted in the frequency gap between two adjacent frequency FM services at the same location or in the free frequency ranges at both sides of an FM service, while leaving out its rated frequency occupation. Compared to the level of the RF carrier of the adjacent frequency FM service or the FM service in the middle, the level of the plurality of RF carriers is selected to be sufficiently low in the sense of a signal to noise ratio that is sufficient for FM reception of the FM service or services. Moreover, the mentioned level is selected to be sufficiently high in the sense of noise immunity against locally remote FM services which fall into the frequency range or frequency gap intended for the transmission of the plurality of RF carriers. The data stream modulating the RF carriers is provided with increased error protection in the sense of providing sufficient noise immunity against the adjacent frequency FM service or services or the FM service or services in the middle.

6 Claims, 2 Drawing Sheets

METHOD FOR BROADCASTING A DIGITALLY CODED STREAM OF DATA USING AN ALREADY OCCUPIED FREQUENCY SPECTRUM

BACKGROUND OF THE INVENTION

The invention relates to a method for broadcasting a digitally coded stream of data containing information about one or a plurality of radio programs or other data, wherein the data stream is distributed to a plurality of RF carriers.

For the terrestrial transmission of digitally coded audio radio program signals it is known to employ the so-called DAB (digital audio broadcasting) system to divide the resulting data stream of several radio programs to a plurality of RF carriers. In order to keep the influences of Raleigh fading in multi-path reception, particularly in mobile reception situations, as low as possible, the frequency range occupied by these RF carriers lies in a range from 1 to 4 MHz. However, it is difficult to find such broad frequency ranges in the frequency spectra suitable and intended for radio broadcasting.

SUMMARY OF THE INVENTION

It is therefore the object of the invention to provide a transmission method which permits the additional utilization of an already occupied frequency spectrum for the radio transmission of a data stream without interfering with the services already established there.

This is accomplished according to the invention by employing a frequency band already occupied by FM services to transmit the plurality of RF carriers, with each FM service maintaining a sufficient frequency spacing from the FM services broadcast at the same location, and being sufficiently separated at a smaller frequency spacing from the other local FM services transmitting at closely adjacent locations. The plurality of RF carriers modulated with the data stream are transmitted either in the frequency gap between two adjacent FM services at the same location, or in the unoccupied frequency ranges on both sides of an FM service, thereby leaving out the rated frequency occupation of the FM service. The overall amplitude level of the plurality of RF carriers compared to the level of an RF carrier of an adjacent frequency FM service, or the FM service in the middle, is selected to be sufficiently low relative to a signal to noise ratio sufficient for the FM reception of the FM service or services, and sufficiently high to provide noise immunity against locally remote FM services that fall into the frequency range or frequency gap intended for the transmission of the plurality of RF carriers. The data stream modulating the RF carriers is provided with a greater error protection to provide sufficient noise immunity against the adjacent FM service or services, or the FM service in the middle. The data stream can be transmitted on both sides of an FM service, in which case a notch filter is employed to filter out the plurality of RF carriers, with a stop band of the notch filter corresponding to the frequency position of the respective FM service. Alternatively, the data stream can be transmitted in the frequency gap between two adjacent frequency FM services, in which case a bandpass filter is employed to filter out the plurality of RF carriers, with a passband of the bandpass filter being narrower than the frequency gap, and at least as wide as the frequency range occupied by the plurality of RF carriers. The data stream is preferably received so that existing noise components in the FM service or services are substantially suppressed in the data stream with the aid of an equalization algorithm when the data stream is processed, after evaluation of the FM signal or signals of the FM service or services.

BRIEF DESCRIPTION OF THE DRAWINGS

The invention will now be described in greater detail with reference to embodiments thereof that are illustrated in the drawings, in which.

DETAILED DESCRIPTION OF THE INVENTION

Figure 1:
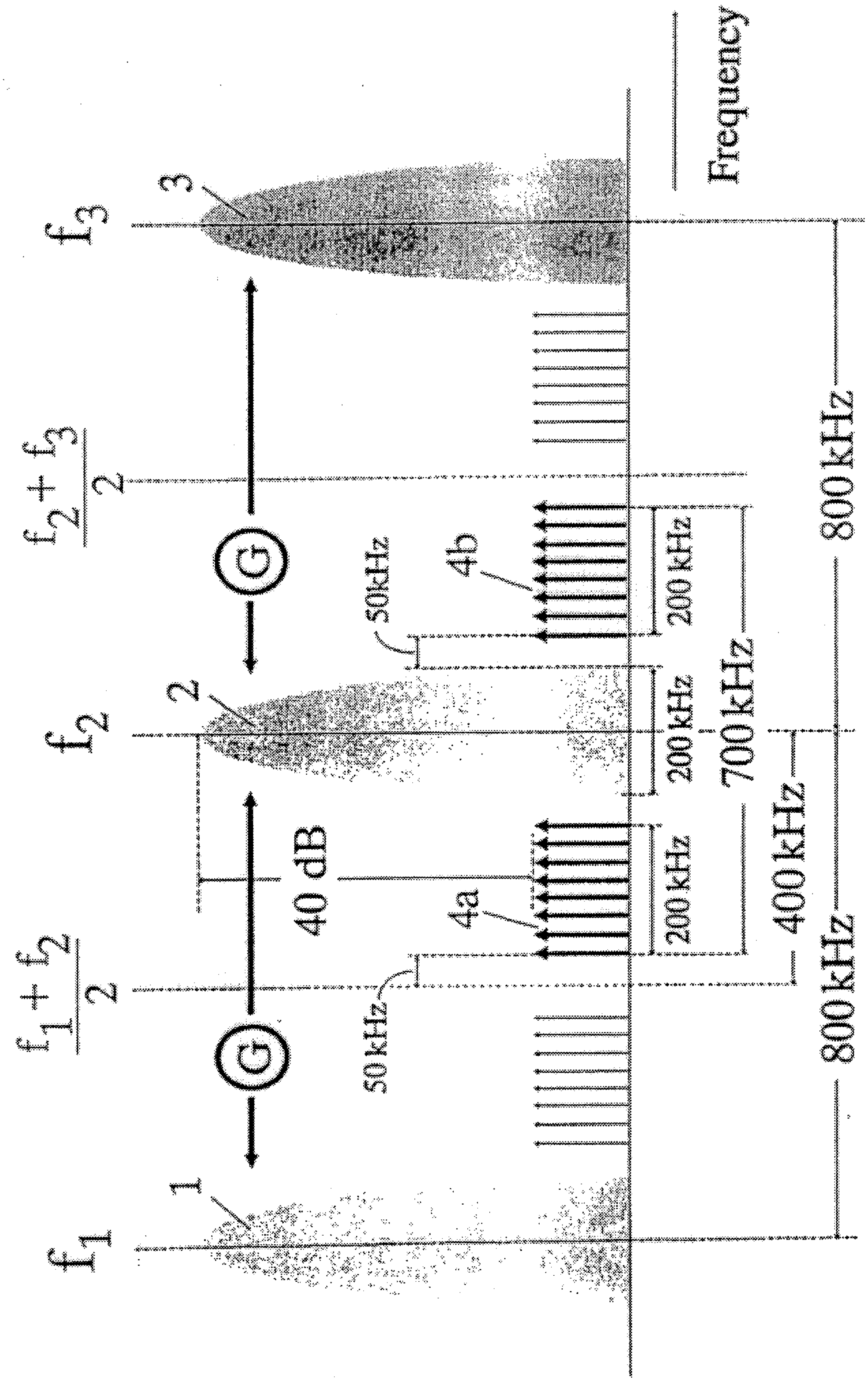
FIG. 1 is a frequency diagram for a first embodiment of the method according to the invention.
Figure 2:
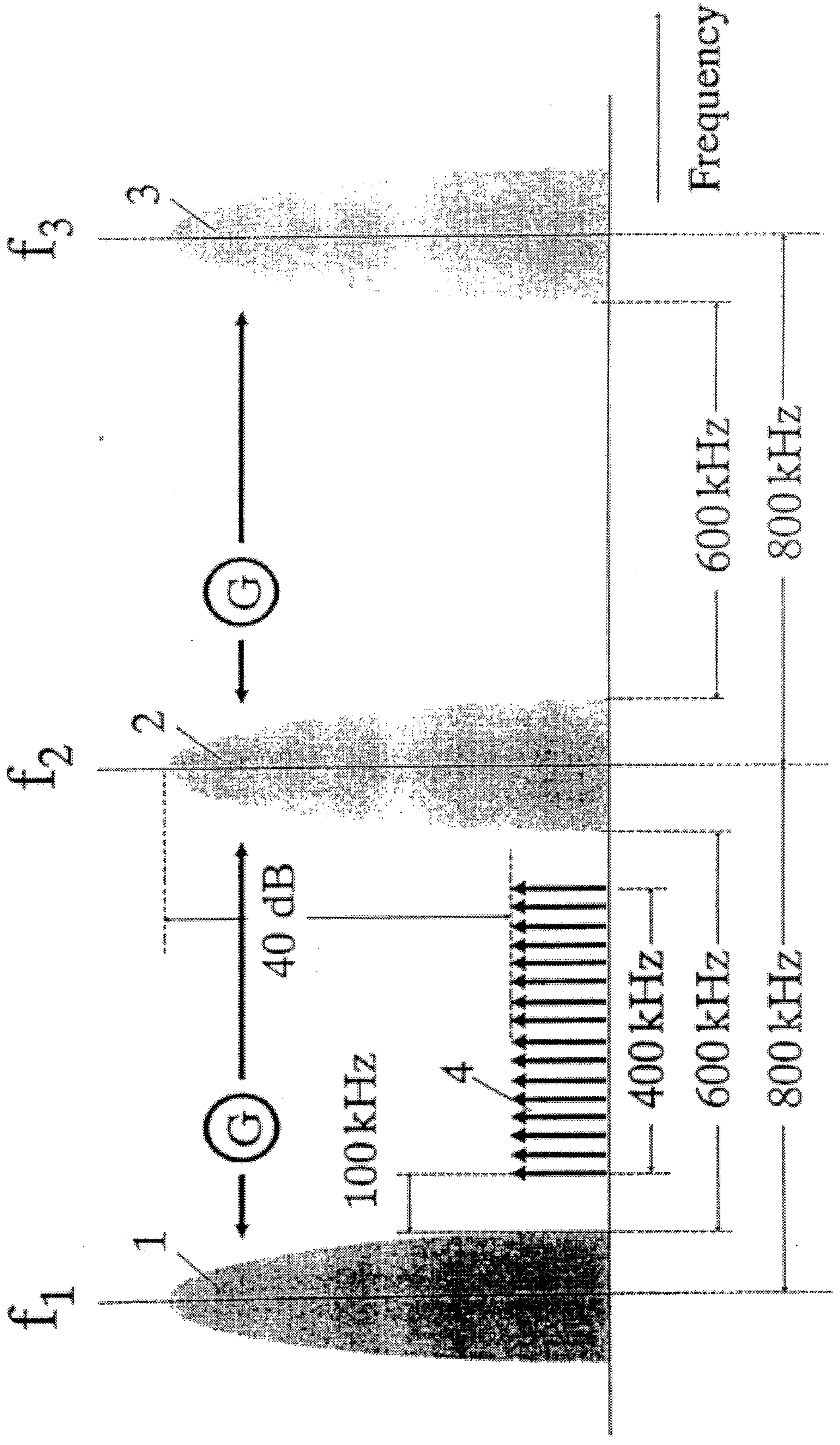
FIG. 2 is a frequency diagram for a second embodiment of the method according to the invention.

The frequency diagrams according to FIGS. 1 and 2 depict the RF carriers f1, f2 and f3 of three FM services 1, 2 and 3 with a rated energy distribution curve for the FM modulation at a rated frequency deviation of 50 kHz. The three FM services 1, 2 and 3 are broadcast at the same location and their RF carrier frequencies are spaced sufficiently far apart, for example, at 800 kHz.

As indicated in FIG. 2, with a rated frequency deviation of the FM services of 50 kHz, the frequency gap "G" between two adjacent frequency FM services 1, 2, 3, has a value of 600 kHz.

To transmit a digitally coded data stream according to the invention in the frequency band occupied by FM services 1, 2 and 3, the data stream is distributed to a plurality of RF carriers which are modulated with the digitally coded data, for example, in 4 PSK modulation. Only the frequency gaps "G" between adjacent FM services 1, 2 and 3 are appropriate for the mentioned insertion, with FIGS. 1 and 2 showing two different possibilities for insertions. In the case of FIG. 2, the data signal 4, which represents the plurality of RF carriers that are already modulated with the data, is inserted into the frequency gap between FM services 1 and 2 in such a manner that a safety distance to FM services 1 and 2 remains on both sides of the data signal. This safety distance is dimensioned according to the actual frequency deviation of the respective service 1 or 2. On the basis of the above frequency information, a distance in an order of magnitude of 100 kHz between the edges of digital signal 4 and the adjacent FM services 1 and 2, respectively, is sufficient so that a frequency range of about 400 kHz is available for digital signal 4. In this frequency range, for example, 25 RF carriers can be inserted which are modulated in 4 PSK modulation with the digitally coded data stream to be additionally transmitted. A number of 25 RF carriers is sufficient to practically eliminate the influences of Raleigh fading due to multi-path reception in the terrestrial transmission of a single digitally coded audio radio program for mobile reception. In addition to the audio radio program, other data can be transmitted in the data stream of the data signal to include additional information regarding the type of program (music, voice), the name of the station, radio text (which is optically reproduced on a display) or other non program specific informations.

In order to minimize the mutual interference between FM services 1 and 2 and data signal 4, the amplitude level of the RF carriers of data signal 4 is selected to be substantially lower than the level of the FM services; for example, the levels are spaced at 40 db, as entered in FIG. 2. Such a spacing of 40 db ensures that the reception of FM services 1 and 2 is not audibly interfered with by the insertion of data signal 4. The interfering effect of FM services 1 and 2 on data signal 4 is less critical in any case since data signal 4 can be coded with a correspondingly higher error protection, which is not the case for the much more interference sensitive analog FM signals of services 1 and 2. Error protection for the data signal 4 may be graduated in such a way that the RF carriers for data signal 4 transmitted in the vicinity of FM services 1 and 2 receive greater error protection than the RF carriers of data signal 4 that are more remote from FM services 1 and 2. Moreover, FM services 1 and 2, in their capacity as interference generators for data signal 4, can be accurately detected by measurements so that a receiver for data signal 4 is able to take countermeasures, when processing the data signal, against the measured FM services 1 and 2 to thus be able to completely compensate their interfering influences.

The interference in data signal 4, however, also involves locally more remote FM services, whose RF carrier falls into the frequency gap "G" between FM services 1 and 2. Since the energy of these locally remote FM services decreases with increasing distance from the broadcasting location of FM services 1 and 2 and of data signal 4, care must merely be taken that the amplitude level of data signal 4 is higher than the highest level of the locally remote FM services that are incident at the location from where data signal 4 is transmitted in order to give data signal 4 sufficient noise immunity against locally remote FM services. The above considerations of course make it evident that the range for reception of data signal 4 is a function of the distance of such locally remote FM services that fall into frequency gap "G". However, the noise immunity of digital signal 4 is sufficient in any case to supply large cities with digital signal 4.

In the alternative according to FIG. 1, the data signal is divided into two components **4*a* and 4*b* which are transmitted symmetrically, or also asymmetrically, on both sides of an FM service; in the exemplary case under consideration, this is FM service 2. As can be seen clearly in FIG. 1, each partial data signal 4*a*and 4*b* here is spaced with respect to frequency from the "middle" FM service 2 and from the center frequency (F1+F2)/2 and (F2+F3)/2, respectively, of the respective frequency gap "G". Thus a data signal composed of partial signals 4*a*and 4*b* can be transmitted for every FM service 1, 2 and 3**, providing an unequivocal association between data signal and FM service which may be of great significance from a radio engineering point of view.

If one dimensions the distance of each partial data signal **4*a*and 4*b* in such a way that a frequency spacing of 50 kHz is maintained from the adjacent FM service 2 and a frequency spacing of 50 kHz from the center frequency of the respective frequency gap "G", a frequency range of 200 kHz remains for each partial data signal 4*a*and 4*b***.

With respect to the avoidance of mutual interference between the FM services, on the one hand, and the partial data signals **4*a*and 4*b*, on the other hand, the same considerations apply as for the embodiment according to FIG. 2**.

For reception of the data stream (partial signals **4*a* and 4*b*) transmitted according to the embodiment of FIG. 1, the RF carriers of partial signals 4*a*and 4*b* are filtered out of the frequency band occupied according to FIG. 1 with the aid of a notch filter whose stop band corresponds to the frequency position of FM service 2. The filtered-out RF carriers of partial signals 4*a* and 4*b*** are then subjected to a 4 PSK demodulation so that the data stream is available for further processing (channel decoding, source decoding) including error correction and error masking. For error correction, the previously measured FM service may be utilized, as already mentioned, in phase opposition in order to compensate the noise influences caused by the FM service.

In the case of a transmission of the data stream according to the embodiment of FIG. 2, the RF carriers of data signal 4 are filtered out with the aid of a bandpass filter whose passband is narrower than frequency gap "G" and at least as wide as the frequency range occupied by data signal 4. The filtered-out plurality of RF carriers of data signal 4 is then again subjected to a 4 PSK demodulation, whereupon the data stream is available for further processing.

We claim:

1. A method for broadcasting a digitally coded stream of data containing information about one or a plurality of radio programs or other data, wherein the stream of data is distributed to a plurality of RF carriers, comprising the steps of (a) employing a frequency band already occupied by FM services to transmit the plurality of RF carriers, with each FM service maintaining a sufficient frequency spacing from the other FM services broadcast at the same location, and being sufficiently separated at a smaller frequency spacing from other local FM services transmitting at closely adjacent locations;

(b) transmitting the plurality of RF carriers modulated with the stream of data either in the frequency gap between two adjacent FM services at the same location, or in the unoccupied frequency ranges on both sides of an FM service, thereby leaving out the rated frequency occupation of said FM service; and (c) selecting the overall amplitude level of the plurality of RF carriers, compared to the level of an RF carrier of an adjacent FM service or the FM service in the middle, to be sufficiently low relative to a signal to noise ratio sufficient for the FM reception of the FM service or services, and sufficiently high to provide noise immunity against the other local FM services that fall into the frequency range or frequency gap intended for the transmission of the plurality of RF carriers; and (d) providing the stream of data modulating the RF carriers with a greater error protection to provide sufficient noise immunity against the adjacent FM service or services or the FM service in the middle.

2. A method according to claim 1, wherein a portion of the data stream transmitted on the RF carriers which are interfered with to a greater extent by the FM service or services than the remaining portions of the data stream are provided with increased error protection.

3. A method according to claim 1, wherein the transmitting power of the RF carrier of the adjacent FM service or of the FM service in the middle is controlled as a function of its frequency deviation so that, if the frequency deviation is great, the transmitting power is reduced.

4. A method of receiving a data stream transmitted according to claim 1, wherein the plurality of RF carriers is transmitted on both sides of an FM service, and wherein a notch filter is employed to filter out the plurality of RF carriers, with a stop band of said notch filter corresponding to the frequency position of the respective FM service.

5. A method of receiving a data stream transmitted according to claim 1, wherein the plurality of RF carriers is transmitted in the frequency gap between two adjacent FM services, and wherein a bandpass filter is employed to filter out the plurality of RF carriers, with a passband of said bandpass filter being narrower than the frequency gap, and at least as wide as the frequency range occupied by the plurality of RF carriers.

6. A method according to claim 4, wherein existing noise components in the FM service or services are substantially suppressed in the data stream with the aid of an equalization algorithm when said data stream is processed, after evaluation of the FM signal or signals of the FM service or services.

* * * * *